(12) United States Patent
Cai

(10) Patent No.: US 7,779,991 B2
(45) Date of Patent: Aug. 24, 2010

(54) BIDIRECTIONAL BULK MATERIAL GATHERING APPARATUS AND METHODS FOR GATHERING BULK MATERIALS

(76) Inventor: Jinquan Cai, Room 2801, No. 1079, Dalian Road, Shanghai (CN) 200086

( * ) Notice: Subject to any disclaimer, the term of this patent is extended or adjusted under 35 U.S.C. 154(b) by 0 days.

(21) Appl. No.: 12/101,990

(22) Filed: Apr. 13, 2008

(65) Prior Publication Data

US 2008/0189989 A1  Aug. 14, 2008

Related U.S. Application Data

(63) Continuation of application No. PCT/CN2006/001822, filed on Jul. 24, 2006.

(30) Foreign Application Priority Data

Oct. 13, 2005  (CN) .................. 2005 1 0030487

(51) Int. Cl.
 *B65G 17/36* (2006.01)
(52) U.S. Cl. .................................... 198/703
(58) Field of Classification Search ............... 37/142.5, 37/466, 403, 195, 404–409, 902, 903; 241/101.72, 241/101.73, 189.1, 286; 144/4.1, 34.1, 336, 144/335; 414/688, 729; 198/412, 418, 608, 198/612, 624, 642, 743, 745, 735.2, 703, 198/704

See application file for complete search history.

(56) References Cited

U.S. PATENT DOCUMENTS

| | | | | | |
|---|---|---|---|---|---|
| 4,159,055 | A | * | 6/1979 | Eberle | 198/512 |
| 5,060,732 | A | * | 10/1991 | Baskett | 171/63 |
| 5,222,563 | A | * | 6/1993 | Van Horlick | 172/111 |
| 5,405,092 | A | * | 4/1995 | Jonninen | 241/27 |
| 5,619,811 | A | * | 4/1997 | Yrjola | 37/466 |
| 5,630,476 | A | * | 5/1997 | Foster et al. | 171/63 |
| 5,697,489 | A | * | 12/1997 | Deonarine et al. | 198/464.4 |
| 6,668,880 | B2 | * | 12/2003 | Nordstrom | 144/4.1 |
| 6,871,807 | B2 | * | 3/2005 | Rossi, Jr. | 241/101.72 |
| 7,213,699 | B2 | * | 5/2007 | Adams | 198/608 |

* cited by examiner

*Primary Examiner*—Robert E Pezzuto
(74) *Attorney, Agent, or Firm*—Matthias Scholl P.C.; Matthias Scholl

(57) ABSTRACT

A material gathering apparatus with a bucket; a motor having a shaft; and a plurality of blades; in which the hydraulic motor is fixed below the bucket; and the plurality of blades are fixed within the bucket and are rotatable clockwise or counterclockwise around the shaft.

7 Claims, 2 Drawing Sheets

BIDIRECTIONAL BULK MATERIAL GATHERING APPARATUS AND METHODS FOR GATHERING BULK MATERIALS

CROSS-REFERENCE TO RELATED APPLICATIONS

This application is a continuation of International Patent Application No. PCT/CN2006/001822 with an international filing date of Jul. 24, 2006, designating the United States, now pending, and further claims priority benefits to Chinese Patent Application No. 200510030487.9, filed on Oct. 13, 2005. The contents of these specifications are incorporated herein by reference.

BACKGROUND OF THE INVENTION

1. Field of the Invention

The invention relates to hoisting and conveying machinery, and in particular to a to a bulk material gathering apparatus with a bucket wheel and to methods for gathering bulk materials using the bulk material gathering apparatus with a bucket wheel.

2. Description of the Related Art

Conventional bulk material gathering and transferring machines are described, for example, in "Hoisting and Conveying Machinery Product Sample" (Lu Yansun, 2005, $2^{nd}$ Ed, China Heavy Machinery Industry Association and Beijing Hoisting Machinery Institute, pp. 903-931). These machines suffer from many problems and shortcomings including: 1) Difficult alignment of head assemblies and conveyor belts; 2) Discrepancies between the gathering speed and the transport speed; 3) Low production efficiency; 4) Need to use high deadweights due to torsional forces created during operation which further reduces efficiency; 5) High wheel pressure (up to 390 tons), which makes movement difficult, lowers construction speed, and increases cost.

Although certain improvements have been made recently in this area of technology to overcome the existing problems and shortcoming (e.g., increase in bucket size in Chinese made MDQ bulk material gathering model), much opportunity for improvement remains.

SUMMARY OF THE INVENTION

In one embodiment, the invention provides a material gathering apparatus, comprising: a bucket; a motor having a shaft; and a plurality of blades; wherein the hydraulic motor is fixed below the bucket; and the plurality of blades are fixed within the bucket and are rotatable clockwise or counterclockwise around the shaft.

In certain classes of this embodiment, the apparatus further comprises bucket teeth for latching onto bulk material.

In certain classes of this embodiment, the apparatus further comprises a discharge frame forming a discharge opening for transporting bulk material to a conveyor.

In another embodiment, the invention provides a method for gathering material using the apparatus described herein, comprising supplying power to the motor and orienting the apparatus so that the blades come in contact with the material, whereby the motor turns the blades in a clockwise or counterclockwise direction and the blades gather material into the bucket In a class of this embodiment, the material is moved along by the blades toward the discharge opening (15) and falls into the discharge opening (15)

In a class of this embodiment, the blades rotate in a plane that forms an angle of between 15 degrees and 75 degrees with respect to the ground.

DETAILED DESCRIPTION OF THE INVENTION

The invention provides in certain aspects a bidirectionally-rotating bulk material-gathering apparatus for use, e.g., in coal and ore mining and in specialized dock construction, which features equal gathering and transporting speed, high efficiency, easy alignment with conveying equipment, and smaller torque forces.

Figure 1:
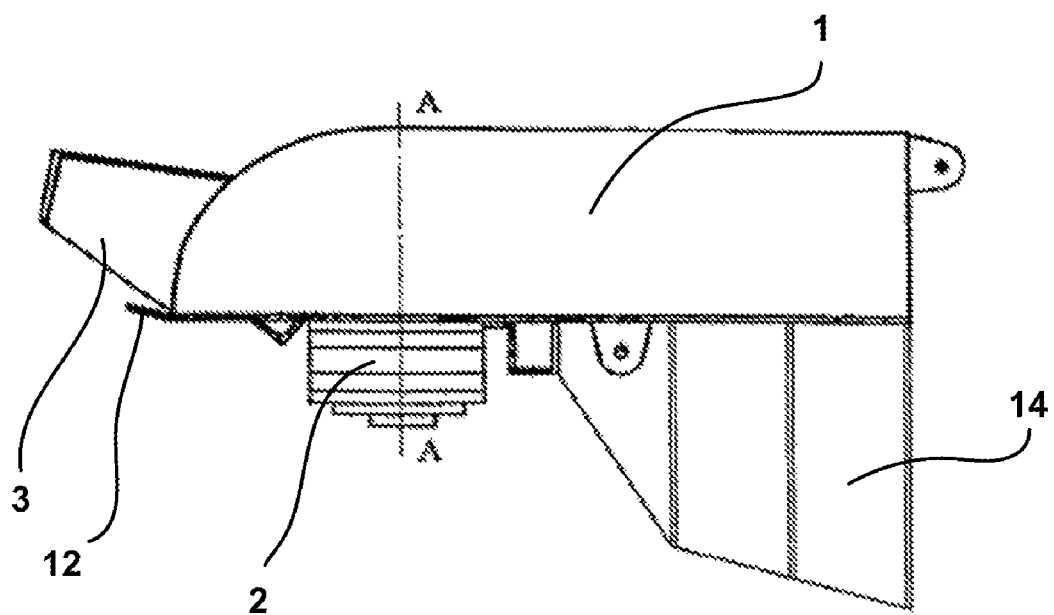
FIG. 1 is a side elevational view of the bulk material gathering apparatus in accordance with one embodiment of the invention.
Figure 2:
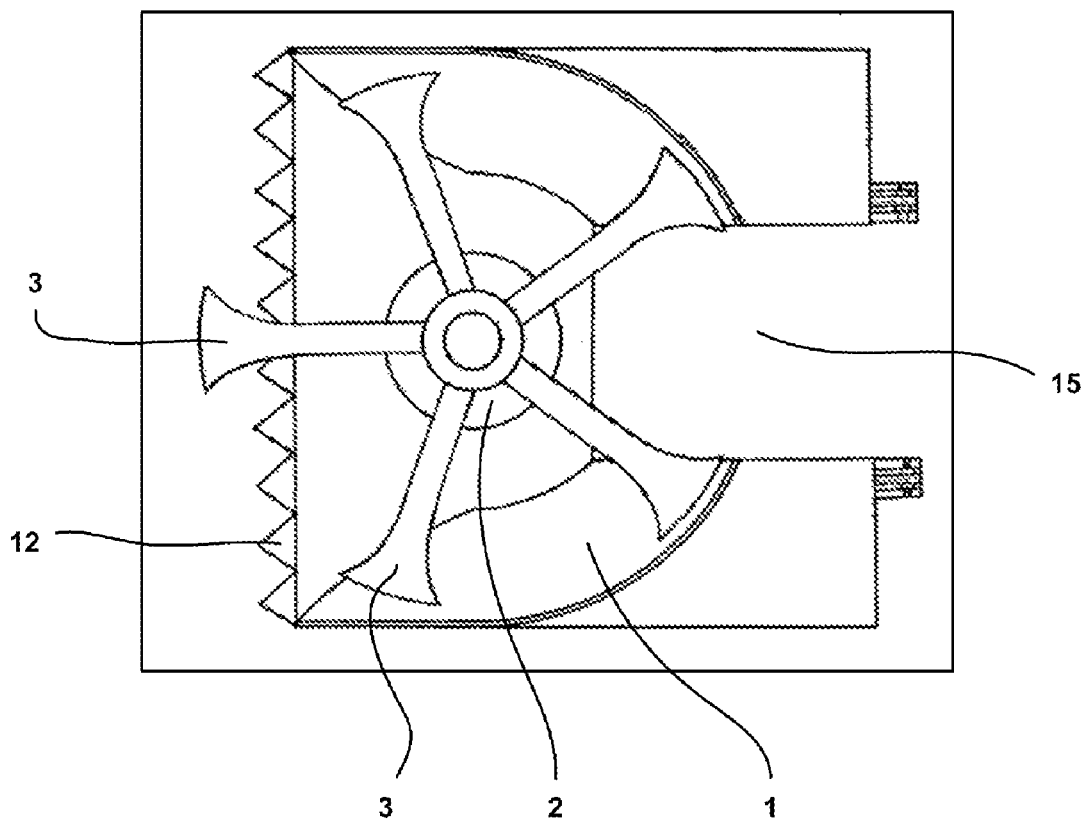
FIG. 2 is a top plan view thereof.
Figure 3:
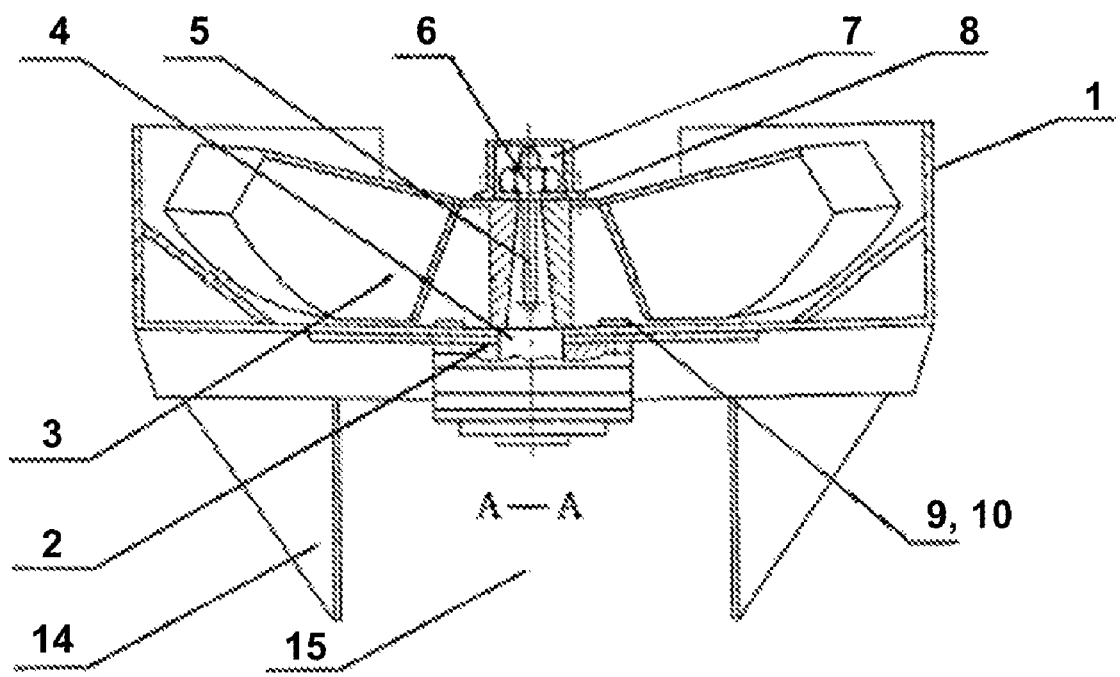
FIG. 3 is a cross-sectional view thereof along line A-A in FIG. 1.

With reference to FIGS. 1-3, the hydraulic motor 2 having a cone shaft 4 is attached to the bucket 1 with the bolt 9 and the spring washer 10. The motor 2 is disposed underneath the bucket 1. A plurality of rotatable scraper blades 3 is disposed on the shaft 4 and fastened with the bolt 5 and the nut 6. The bolt 5 and the nut 6 are protected with the cap 7 secured by the screw 8. The blades 3 are disposed within the bucket 1, and the bucket 1 functions to collect bulk material dislodged and/or scraped into the bucket by the blades 3. The length of the blades 3 is chosen so that when rotating around the shaft 4, the blades periodically project outside of the bucket 1 and the bucket teeth 12 allowing the blades to scrape bulk material into the bucket 1.

Other structures found in conventional bulk material gathering machines are retained unchanged or with appropriate modifications. For example, the reclaiming head of the original bucket wheel machine may be removed. All remnants of the cantilever belt conveyor may be eliminated. The bucket wheel machine head may be dismantled. The lug support base may be fixedly welded on the cantilever belt conveyor. And, the front lug support base may be welded above the roller vertical centerline of the belt conveyor.

The apparatus of the invention achieves the purpose of automatic matter gathering by horizontal scratching. Bulk materials are scratched into the bucket with rotating blades powered by the hydraulic motor in order to transmit them to the discharge opening 15 formed by the bucket 1 and the discharge frame 14 and direct to the conveyor belt. Blade rotation (clockwise or counterclockwise) is smooth and material is continuously transmitted to the discharge opening 15 along the bucket slope, and on to the belt conveyer.

The blades can be extended outside the bucket teeth to a maximum scratch distance. The inclination angle between the ground and the blades (corresponding to cantilever belt conveyer inclination angle) shall not exceed 90 degrees and preferably remain in the range of between 15 degrees and 75 degrees.

The apparatus is applicable to the transportation of coal, ores, yellow sand stone, bulk materials, and other matter, and can be widely used in harbors, mines, steel plants, large stockyards, etc.

The invention provides the following advantages:

1) High production efficiency: The bidirectional rotatable apparatus uses a horizontal rotatable scraping method instead of the traditional vertical bucket wheel material-reclaiming method. A shovel is not used and materials are not hoisted. Power is saved and bucket capacity is increased. Therefore, an unexpected result is produced, the gathering and transporting of materials is performed at the same speed, which saves energy.

2) Improved design: The bucket is easily centered with the conveyor. This improves the forces acting on the conveyor eliminating unwanted torques. The strength and stiffness requirements of the conveyor belt are decreased, which increases efficiency and allows the head size to be reduced. This in turn reduces weight of the apparatus, increases the stability, and saves manufacturing cost.

3) The bulk material gathering apparatus of the invention is lighter which conventional machines, which lowers support and foundation requirements and makes the apparatus more versatile.

4) The invention overcomes various other disadvantages and shortcomings of conventional bulk matter gathering machines.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. An apparatus for gathering material, comprising:
    a bucket (1) having a main bucket surface, an intake opening and a discharge frame with a discharge opening;
    a motor (2) having a shaft (4); and
    a plurality of blades (3);
    wherein
        said blades (3) are fixed within said bucket (1) and are rotatable around said shaft (4) in a plane of rotation, said plane of rotation being parallel to said main bucket surface;
        said blades (3) are adapted for to rotate in a substantially horizontal plane;
        said blades project out of said main bucket surface whereby allowing material to be gathered into said bucket by said blades without moving said bucket;
        said motor (2) is fixed outside the bucket (1) below the plane of rotation of the blades (3), and below said main bucket surface;
        said intake opening is disposed above said main bucket surface and is adapted to allow said material to enter the bucket in a direction substantially parallel to the plane of rotation of the blades and substantially parallel to said main bucket surface; and
        said discharge frame is disposed below said main bucket surface and is adapted to allow said material to exit said bucket in a direction substantially perpendicular to said plane of rotation of said blades and substantially perpendicular to said main bucket surface.

2. The apparatus of claim 1, wherein said blades (3) are adapted to rotate in a plane parallel to a plane in which said material enters said bucket.

3. The apparatus of claim 1 further comprising bucket teeth (12) for latching onto said material.

4. The apparatus of claim 1 wherein said blades (3) are adapted to gather said material into said bucket (1) but are not adapted to crush said material.

5. A method for gathering material using the apparatus of claim 1 comprising supplying power to said motor (2) and orienting the apparatus so that the blades (3) come in contact with the material, whereby said motor (2) turns the blades (3) in a clockwise or counterclockwise direction and the blades (3) gather material into the bucket (1).

6. The method of claim 5 wherein the material is moved along by the blades toward the discharge opening (15) and falls into the discharge opening (15).

7. The method of claim 5 wherein the blades rotate in a plane that forms an angle of between 15 degrees and 75 degrees with respect to the ground.

\* \* \* \* \*